United States Patent [19]

Craiglow

[11] 4,267,592

[45] May 12, 1981

[54] ANTI-JAM RADIO

[75] Inventor: Robert L. Craiglow, Cedar Rapids, Iowa

[73] Assignee: Rockwell International Corporation, El Segundo, Calif.

[21] Appl. No.: 25,527

[22] Filed: Mar. 30, 1979

[51] Int. Cl.³ .............................................. H04L 5/14

[52] U.S. Cl. ...................................... 370/29; 370/109; 375/1

[58] Field of Search ..................... 370/29, 109, 24, 31; 375/1, 2, 38, 97; 455/63; 179/15.55 T

[56] References Cited

U.S. PATENT DOCUMENTS

| | | | |
|---|---|---|---|
| 3,020,399 | 2/1962 | Hollis | 375/1 |
| 3,493,866 | 2/1970 | Miller | 375/1 |
| 3,676,862 | 7/1972 | Sasabe | 179/15.55 T |
| 3,827,052 | 7/1974 | Tanaka | 370/29 |
| 4,030,033 | 6/1977 | Bibl et al. | 375/1 |
| 4,034,295 | 7/1977 | Kotezawa et al. | 370/29 |
| 4,066,964 | 1/1978 | Costanza et al. | 325/55 |
| 4,112,372 | 9/1978 | Holmes et al. | 325/321 |

OTHER PUBLICATIONS

"A Major Effort Towards Jam-Resistant Secure Communications", *Interavia,* 11/1978, pp. 1042–1046.

"A Time Compression Multiplex System", by Kirk, Apr. 1978, pp. 22–30, C-ED.

*Primary Examiner*—Douglas W. Olms

*Attorney, Agent, or Firm*—Richard K. Robinson; Howard R. Greenberg; H. Fredrick Hamann

[57] ABSTRACT

Disclosed is a method and apparatus for transceiving full duplex anti-jam radio signals in a burst of audio data on a carrier frequency that is pseudorandomly selected.

8 Claims, 9 Drawing Figures

100

ANTI-JAM RADIO

BACKGROUND OF THE INVENTION

This invention relates to the method and apparatus for transmitting and receiving anti-jam radio signals.

Although there have been numerous techniques and apparatuses developed for a secured communication system, the two most commonly used techniques for anti-jam protection can roughly be characterized as band spreading and frequency hopping. In band spreading, the frequency band of transmission is greatly increased by adding a high speed pseudorandom data stream to the basic information data or signal. The resulting high data rate signal is spread over a wide spectrum of frequencies. If the frequency is decoded by a receiver using an identical pseudorandom data stream, the basic information can be extracted. Since very little energy occurs at any narrow band point in the transmitted spectrum, the noise-like signal is difficult to detect or jam without correlation and synchronization with the pseudorandom data stream. The degree of protection is frequently stated as a processing gain which is the ratio of the transmitted band to the information band. Effective utilization of this technique requires very wide band radio transmitters and receivers. This requirement makes band spreading incompatible with most existing radios which are narrow band, not only because of the limitations of components presently available, but also because in the past it has been a desirable design feature to increase selectivity in order to reduce mutual interferences.

Frequency hopping involves the changing of the radio carrier or center frequencies periodically to avoid detection or jamming. The degree of protection is, of course, related to the hopping rate and sequence of frequencies. This is somewhat difficult to state quantitatively. However, it can be appreciated that the sophistication of detection and jamming equipment required to constitute a threat to a communications system randomly hopping every hundred milliseconds would be great. Synchronization of the transmitter and receiver is required as in the case with band spreading. Since the prior art hopping rates are low, synchronization is somewhat easier with the frequency hopping method.

Very fast frequency hopping is not compatible with many existing radios because of their slow tuning times. Once again, this limitation is due to the components available at the time of the design of the equipment.

It thus can be concluded that the two prior art methods of protection are limited by the various radio equipment involved and the degree of protection that is required and are limited to half duplex operation without separate transmitters and receivers.

SUMMARY OF THE INVENTION

A method and apparatus is provided for transceiving full duplex anti-jam radio signals in a burst of audio data on a carrier frequency that is pseudorandomly selected.

Equal transmission periods are divided into three segments, a preceding guard band, a transmission period and a following guard band. Upon the initiation of transmission, the radio will convert a voice or soundwave into an analog signal that is digitized. The digital signal is stored in a memory that is capable of being loaded and unloaded simultaneously from separate segments. When the transmission period occurs, a digital packet is formulated that includes a preamble and a block of data that is unloaded from the memory at a greater speed than the speed in which the memory is being loaded. In the preferred embodiment the packet is passed through a code generator for encryption. The digital packet is then transmitted by a data transceiver, that can be any of the commercially available types with a controllable frequency source. At the completion of the transmission period, the radio listens for a response during the following guard band. At the end of the following guard band, the radio hops to a second transmission frequency and listens for a response on the second frequency until the occurrence of the transmission period, at which time a second packet of data is transmitted. If an answer is provided by a remotely located station, then the radio will not hop frequencies until completion of the receipt of the packet.

There is provided a means for pseudorandomly selecting the transmission frequency. The radio can provide full duplex communications or a secondary or emergency channel.

DETAILED DESCRIPTION OF THE INVENTION

Figure 1:
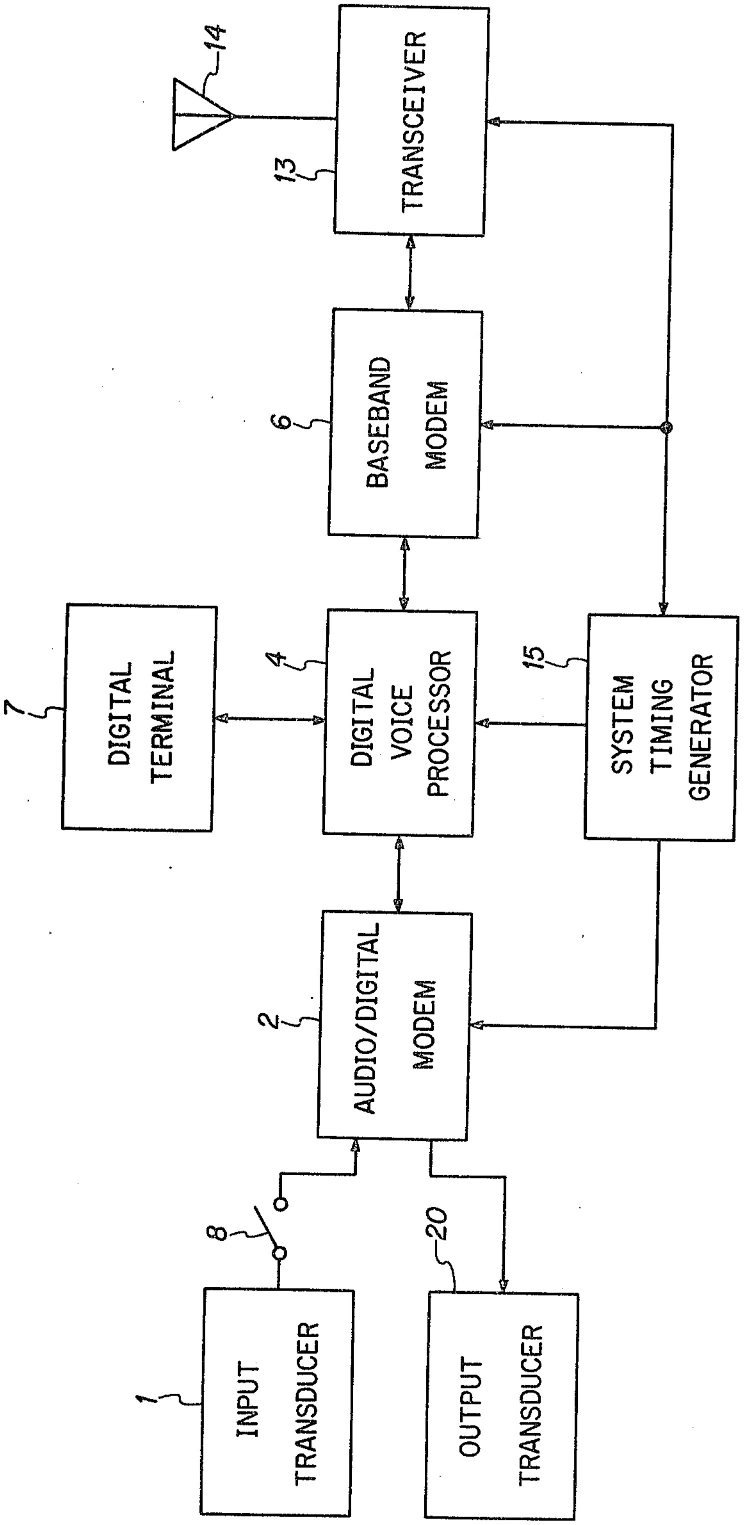
FIG. 1 is a block diagram of an anti-jam radio.
Figure 2:
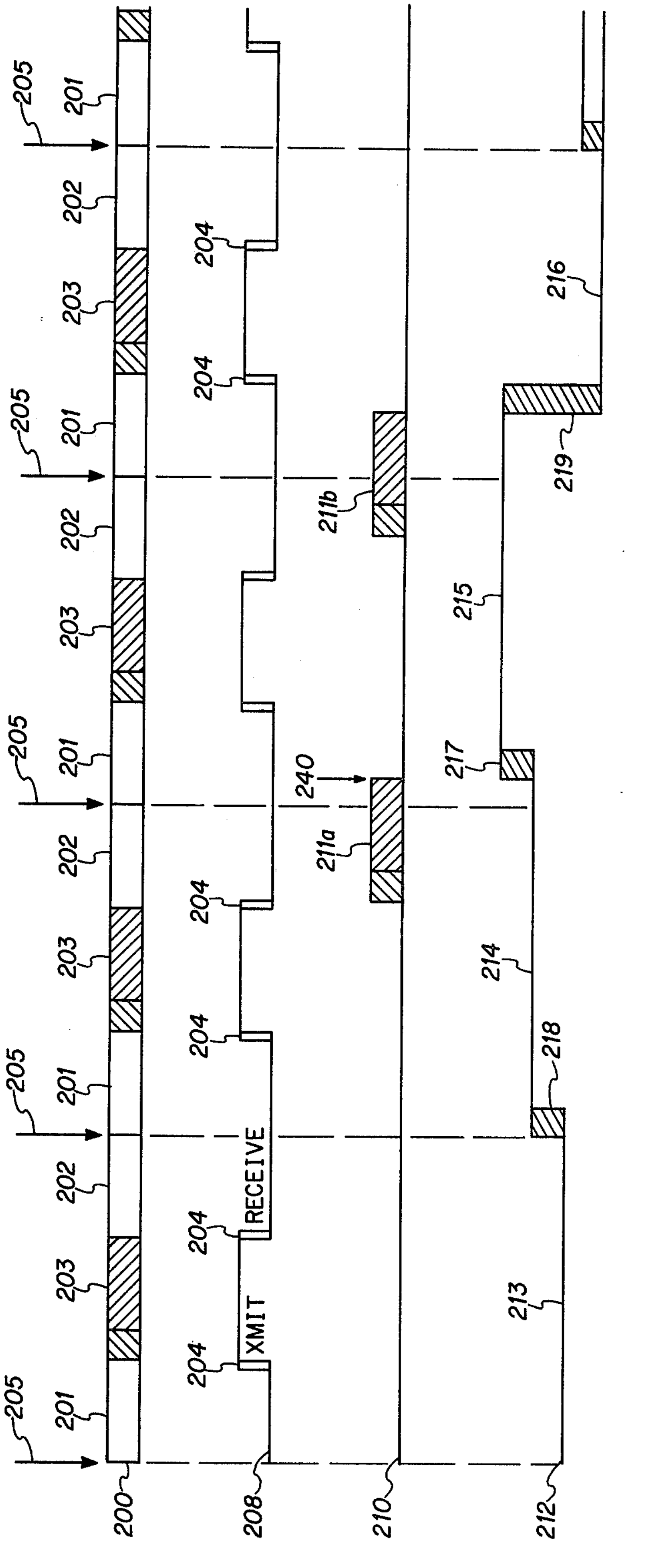
FIG. 2 is a timing diagram of the transmit-receive functions of the radio of FIG. 1.

Reference should now be made to FIG. 1, a block diagram of an anti-jam radio and to FIG. 2, which is a timing diagram of the transmit-receive functions of the anti-jam radio 100 of FIG. 1. On the closing of the transmit switch 8, the input transducer, which may be a device such as a microphone for converting an audio signal into an analog signal, provides an analog signal to the audio-to-digital modem 2. The audio-to-digital modem 2 converts the analog signal that is provided from the input transducer 1 to a digital signal, and applies it to the digital voice processor 4. The digital voice processor 4 accepts digital data from the audio-to-digital modem 2 or from a digital terminal 7 and prepares it for burst mode operation. The preparation for burst mode operation consists of loading the digital data into storage registers within the digital voice processor at a first symbol rate, and then unloading, when the radio transmits in the burst mode, the data from the shift register at a rate greater than the loading rate, normally on the order of two or three times as fast or even faster.

The baseband modem 6 receives the burst message from the digital voice processor 4 and also provides the necessary synchronization and error checking functions for the transmission of the digital data. The digital data is then applied to the transceiver 13 that transmits the message by way of the antenna 14 along with a preamble for synchronization. After the completion of the transmission of the message, the transceiver returns to the listening mode. The timing control and command signals to the transceiver, as well as to the other blocks of the radio is provided by the system timing generator 15.

Referring to FIG. 2, waveform 200 represents the transmission frequency periods with the transmission data blocks 203 being surrounded by the guard bands, a preceding guard band 201 and a following guard band 202, in each transmission frequency period. A transmission frequency period is defined as a period of time that the radio operates on a constant carrier or center frequency, and is the interval of time between the frequency change arrows 205. In the case of the radio 100 of FIG. 1, the transmission frequency period is 50 milliseconds, each guard band is $15\frac{2}{3}$ ms, and the transmission data blocks have a duration of $18\frac{2}{3}$ ms.

Waveform 208 of FIG. 2 represents the mode of operation [i.e., either transmit or receive] of the radio 100. The radio 100 is normally in the listening or receive mode as indicated by waveform 208 being low. However, when the digital voice processor 4 indicates that the transmit register is full (the closing of the switch 8 prior to the transmission of the preamble) and the guard band 201 is about to expire and there is no message being received, then the radio will go into the transmit mode which is indicated by waveform 208 being high. Prior to the change from the receive mode to the transmit mode or vice versa, there is a small uncertainty period 204, approximately 1 ms, in the case of the radio of the preferred embodiment, which is considered to be part of the guard band 201.

In general, a transmission system has two or more identical radios which operate on a master or primary/-remote or secondary configuration. The master station can be defined as the station which transmits first. Thereafter, until the transmission ceases, all the other radio stations are on a secondary mode of operation. For example, in FIG. 2, waveform 210 represents a secondary station's response to a message transmitted by a master station.

If the secondary station has a close proximity to the primary station, then immediately upon the completion of the transmit mode and the uncertainty period 204, the secondary may answer and the master station will immediately receive a packet 211*a* which in the preferred embodiment is $18\frac{2}{3}$ ms in length. The radio 100 will complete receiving the packet 211*a* during the preceding guard band 201. In the case where there is a propagation delay, such as when there is a distantly located secondary station that chooses to answer the message from the master station, then upon completion of the transmission of the packet, as mentioned earlier, the radio that is the master station will go into the listening mode and will listen until it receives a packet such as 211*b* of waveform 210. Packet 211*b* again expires during the guard band 201 and the radio will proceed after this point to go to the next frequency. It is obvious from the above discussion that, given the overall timing diagram, there is a finite distance in which a remotely located radio can respond to a master station without altering the transmission frequency period, the transmission data blocks, and/or the guard bands.

The anti-jam capabilities of the radio are dependent upon its ability to randomly or pseudorandomly change carrier or center frequency. Waveform 212 represents a random or pseudorandom selection of frequencies. Initially, the radio is operating on the carrier or center frequency 213. It then hops to frequency 214 at the expiration of guard band 202 when there is not a detected incoming message. There is a finite amount of time required for the radio to change frequency and to stabilize, represented by the area of uncertainty 218. Immediately at the completion of the receipt of the packet 211*a* during guard band 201, the frequency changes to frequency 215. There is also, as with all frequency changes, an area of uncertainty 217. During each frequency period, the radio will pseudorandomly select a frequency, such as those represented by waveforms 212, and will hop or change to that carrier or center frequency. If there is an incoming packet 211*a* or 211*b*, the radio will wait until the message is completed before hopping to a new frequency.

If there is an incoming packet 211(*a*) or 211(*b*), the transceiver 13 of radio 100 will detect the signal that is picked up by the antenna 14 and pass it on to the baseband modem 6. Baseband modem 6 will downconvert the signal to baseband frequency and also demodulate the signal, providing a digital signal to the digital voice processor 4. At this point, the digital voice processor 4 may output the signal to a digital terminal 7 or pass it on to the audio-to-digital modem 2. The audio-to-digital modem 2 converts the signal to audio frequencies and passes it to the output transducer 20, which is a device such as an audio speaker.

In FIG. 2, waveform 200 represents the initiation of the transmit mode that is precipitated by the closing of the transmit switch 8. At this time, the radio 100 of FIG. 1 is initially in the receive mode and is monitoring on a first carrier frequency, while the digital voice processor 4 is accummulating digital data for the first burst of data to be transmitted.

The mode of operation of the transceiver 13 is controlled by the system timing generator 15, which not only controls the mode of operation, but also the frequency of the modulating signal or the carrier frequency. The accummulated data is transmitted in equally spaced time periods of 50 ms. Around the transmit operation, there are guard bands 201 and 202 of $15\frac{2}{3}$ ms each, which leaves an $18\frac{2}{3}$ ms transmission period. It is during this time that bursts of data are transmitted by the transceiver 13. The transceiver 13 will initiate a transmit cycle during guard band 202, if the digital voice processor has a loaded transmit buffer. Normally, the minimal amount of storage capacity of both the input and the output buffers that are associated with the digital voice processor is equal to the unloading rate divided by the loading rate times the number of symbols per transmission period. For example, in radio 100, it is desired to transmit the data at 48 kilosymbols per second and the registers are loaded at 16 kilosymbols per second, which means that the register capacity must be capable of unloading three symbols for every symbol that is loaded.

When the transmit mode is initiated at the transceiver 13, the system timing generator 15 will initiate the transmit mode of operation approximately $14\frac{2}{3}$ milliseconds within the first transmission period of waveform 200. At the expiration of the first guard band 201 of $15\frac{2}{3}$ milliseconds, the data packet is transmitted. Upon the completion of the transmission, the transceiver returns to the receive mode. While in the receive mode, the transceiver will monitor the first carrier frequency for any message that occurs on that frequency. At the expiration of the first 50 ms period the transceiver hops to the second carrier frequency and will monitor that frequency up and until the initiation of transmission of the second burst of data.

A unique feature of the radio of the preferred embodiment is, that by establishing these unique transmission periods, it is possible to have full duplex operation of the radio without interruption of either the transmit or the receive functions. For example, in FIG. 1, while the input transducer 1 is providing a signal to the audio-to-digital modem 2, the transceiver can be receiving a radio signal and applying it to the baseband modem where it is converted to digital data. The digital data is stored at a high loading rate into the digital voice processor 4, and unloaded at the unloading rate and applied to the autio-to-digital modem 2. The audio-to-digital modem 2 provides an analog representation of the digital data that is applied thereto and this is applied to the output transducer 20. It can be seen from the description of FIG. 1 that if someone were talking into transducer 1, it still would be possible for an incoming message to be relayed to the output transducer thus providing the capability for carrying on a two-way conversation between the terminals, or while one speaker speaks into the input transducer 1, he can be informed that there is an emergency message coming in.

Figure 3:
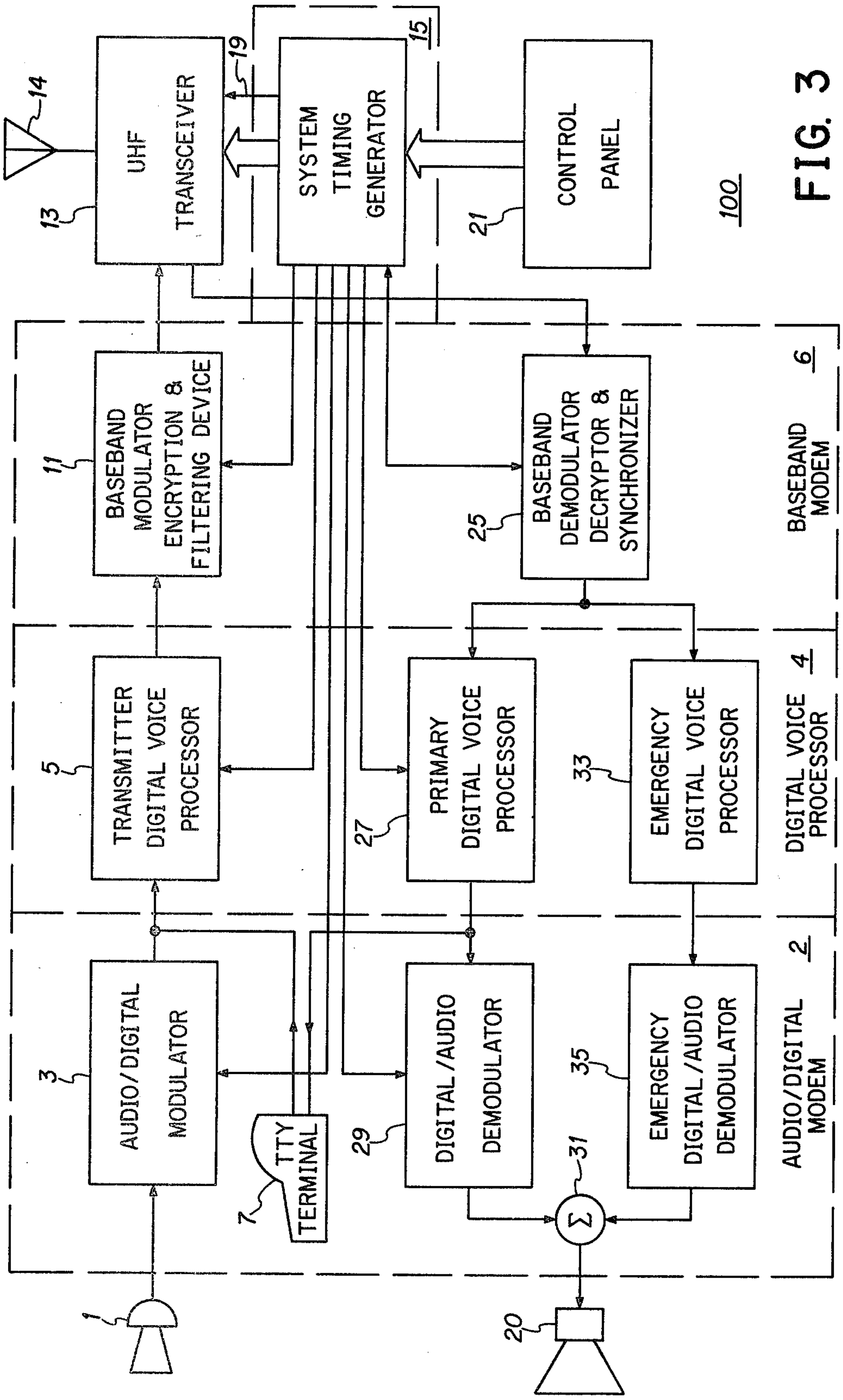
FIG. 3 is a more detailed block diagram of the radio of FIG. 1.

Referring to FIG. 3 which is a more detailed block diagram of the radio 100 of FIG. 1, the microphone 1 converts a voice signal to an electrical signal that is applied to the audio-to-digital modulator 3 section of the autio-to-digital modem 2. The audio-to-digital conversions may be performed by any of the techniques known in the art such as straight forward A to D conversion, pulse code modulations or the preferred, for reasons that shall be explained later, continuously variable slope delta modulation.

The output is a digital data stream that was generated by the audio-to-digital modulator 3 and is applied to the transmitter digital voice processor 5. It should be noted, there is a provision for a digital terminal 7 into the transmitter digital voice processor 5, which provides for direct digital data. The digital voice processor 5 stores the digital data in its memory and provides a digital packet for burst mode transmission to the baseband modem 6, that has included therein a baseband modulator encryption and filtering device 11. The baseband modulator encryption and filtering device 11 generates the preamble 230 of FIG. 2 for the digital data stream and encrypts the digital data, assembles and transmits the burst and provides any necessary filtering and interfacing required between the baseband modem and the transceiver 13. One major requirement for the transceiver is, that its carrier frequency can be digitally controlled or adjusted by a binary code. The code that controls the transmitter frequency of the transceiver 13 is provided by the baseband modulator encryption and filtering device 11 in conjunction with the system timing generator 15.

The control panel 21 initializes the system timing generator and in the case of the preferred embodiment, also provides for entering the time of day for the radio. The system timing generator 15 as discussed earlier, controls the transceiver frequency through the key line 19 which controls the mode of operation, as well as the overall timing for the anti-jam transceiver. The system timing generator can also generate a crypto code for selection of the hopping frequency sequence and for encryption of the digital data stream. In the anti-jam operation, the frequency and channel selection from the control panel 21 is added to the pseudorandom frequency hopping code generated by the crypto generator to obtain the frequency hopping sequence. The timing of the system timing generator is initially set by the reception of a special message on preassigned channels through the receiver, or by search and tracking of the normal anti-jam hopping pattern of another terminal. The special messages can be generated by the master station which is assigned to the first transceiver to broadcast.

In the receive mode of operation as established by the key line 19, the received signal is demodulated in the transceiver 13 and the output is fed into the baseband modem 6 that includes a baseband demodulator, decryptor and synchronizer 25. After downconverting, the baseband signal is fed into an analog correlator which compares the output signal with a locally generated sync preamble. If a correlation spike is obtained that exceeds the squelch threshold, then the clock sequence is started and the remaining symbols of the packets are stored in the primary digital voice processor 27. The output of the primary digital voice processor is passed to the primary digital-to-audio demodulator 29, which for reasons that will be discussed later, is a continuously variable slope delta demodulator, for conversion into an analog signal, the output of which is applied to the speaker 20.

There is also provided a secondary or emergency channel that includes the emergency digital voice processor 33 and the emergency digital-to-audio demodulator 35 so that both the primary and secondary channels can be received simultaneously. The operation of the summing device 31 allows preference to be given to the emergency message.

Figure 4:
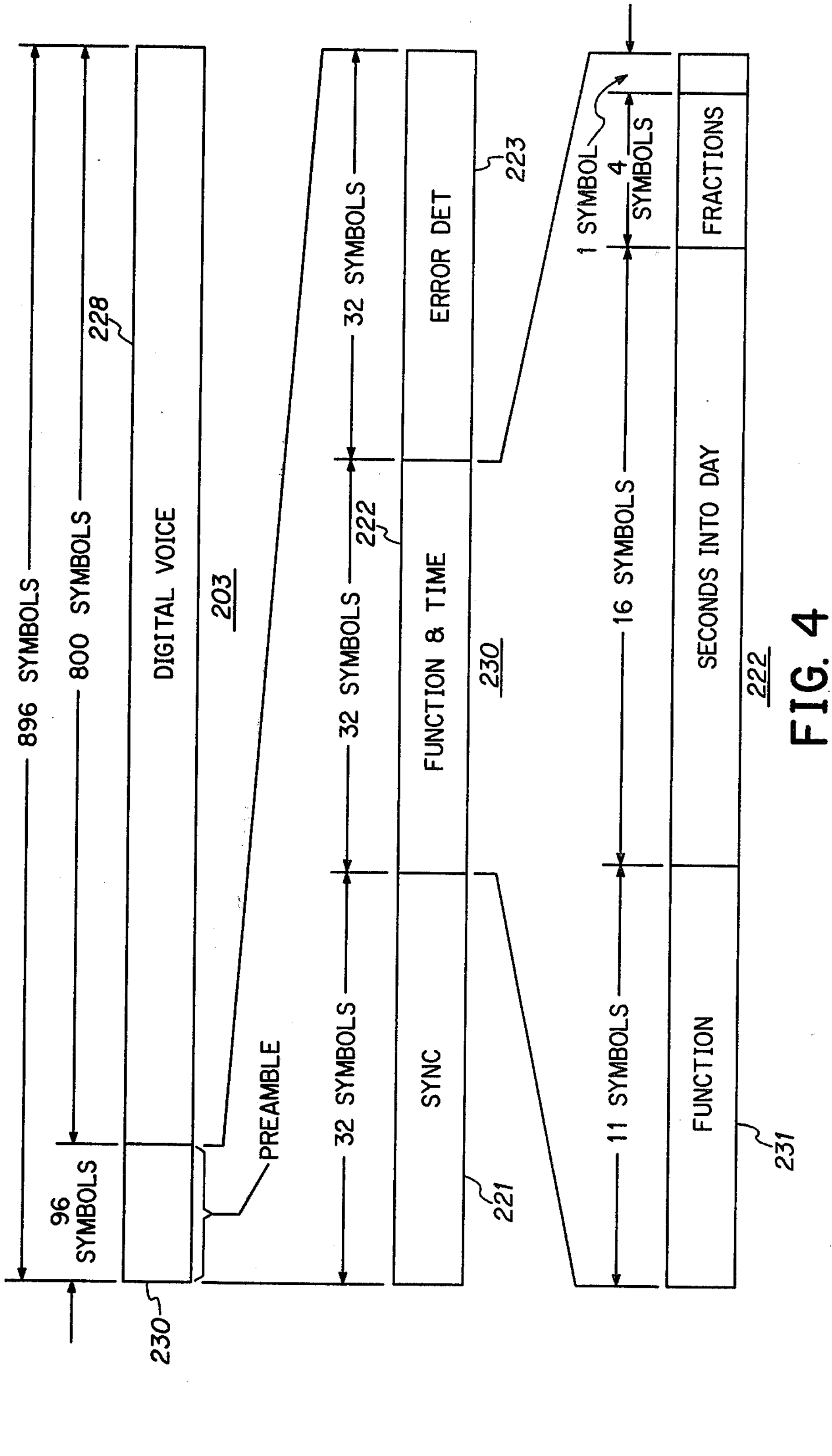
FIG. 4 is a timing diagram of the anti-jam burst format.

FIG. 4 is a timing diagram of the selected burst format of the anti-jam radio 100 which has a hopping rate of 20 hops per second. Data is transmitted during a transmission data block 203 that has a duration of $18\frac{3}{4}$ ms and is surrounded by a guard band of $15\frac{5}{8}$ ms as shown in FIG. 2. Each frame, of course, is 50 ms long and comprises a preamble 230 of 96 symbols, as used herein a symbol is defined as a means of conveying binary data and can be any of the known means including bits, bauds or chips, with an 800 symbol voice message for a total packet of 896 symbols. The major segments of the burst are divided into 32 symbol segments, so that there are three 32 symbol segments in the preamble 230 and 25 symbol segments in the digital voice message 228. The preamble is further broken down into three separate 32 symbol functions. The first 32 symbols are the synchronization symbols 221 and are used to provide squelch as well as packet and symbol sync. The next 32 symbol segment 222 specifies the function and time as entered by the system timing generator from the control panel 21 of FIG. 3 and is further divided into an 11 symbol block 231 that specifies the function or type of message, and the remaining 21 symbols are used to specify time for initialization and/or resynchronization purposes. The functions and time codes are further defined within Table 1. The last 32 symbols of the preamble are for the error detection code 223.

The $15\frac{5}{8}$ ms guard band between the frequency change time and the start of the transmission allows the timing between the user transmitting in the first or primary time slot, represented by waveform 200, transmission block 203 and any receiver to be off by + or $-15\frac{5}{8}$ ms or one guard band. Any transmission in the secondary or energency time slot by a secondary station as represented by waveform 210, receive data block 211_a_ or 211_b_, is timed off the end of the primary transmission block 203 and, therefore, will not interfere with the primary transmission. Thus, no additional guard band between the primary and emergency or secondary time slot is required. The system thus provides a means for the transmission of two data blocks of 18⅔ ms time slots in the transmission frequency period or the 50 ms frequency period in the preferred embodiment, while allowing + or − 1 guard band of timing error between the primary transmitter or station and any receiver. In addition, it is not necessary to preexamine the primary time slot to a given user, since any user would transmit in the primary time slot if after having listened to the channel he found that the primary time slot is not occupied.

TABLE 1

| SYMBOLS | FUNCTION | POSSIBLE CODES |
|---|---|---|
| 1 | Primary vs. Secondary | Primary = 0<br>Secondary = 1 |
| 2–11 | Timing Hierarchy | To be specified by user. |
| 12–27 | Time of Day in Seconds | Binary |
| 28–31 | 1/10 Second Increments | BCD |
| 32 | 1/20 Second Increments | Binary |

The anti-jam system frequency hops at 20 hops per second, so that the normal dwell time at any one frequency is 50 ms. The speech packets are transmitted as burst at 48 kilosymbols per second. If an emergency message is sent, transmission is started one ms after the reception of the primary message. Thus, one ms time is allowed for the transceiver to change from receiving to the transmission mode or vice versa. Of course, no frequency change occurs at this time. Under conditions of no propagation delay and no synchronization error, the end of the emergency packet will end four ms into the next frame as shown in FIG. 2 at point 240.

There are several reasons why it is preferable to use digital voice modulation techniques for the audio-to-digital modem 2 and very desirable to use continuously variable slope delta modulation. Digital voice crypto devices are much smaller and more secure than analog voice crypto devices, so that if secure voice is to be used, digital voice is preferred. Another reason is because it is necessary to store speech and then retransmit the stored speech in the burst mode. This is more economically performed by utilization of digital shift registers. The advantages of using a digital preamble for synchronization and timing initialization are readily known. Except for encoded speech, a digital speech format requires a greater bandwidth than analog speech. It is therefore desirable to use a form of digital speech modulation which can operate at as low a symbol rate as possible consistent with low cost. Continuously variable slope delta modulation can transmit speech of reasonable quality at 16 kilosymbols per second and it is readily available from semiconductor manufacturers as a single integrated circuit chip. These manufacturers include Harris Semiconductor and Motorola, Inc.

Figure 5:
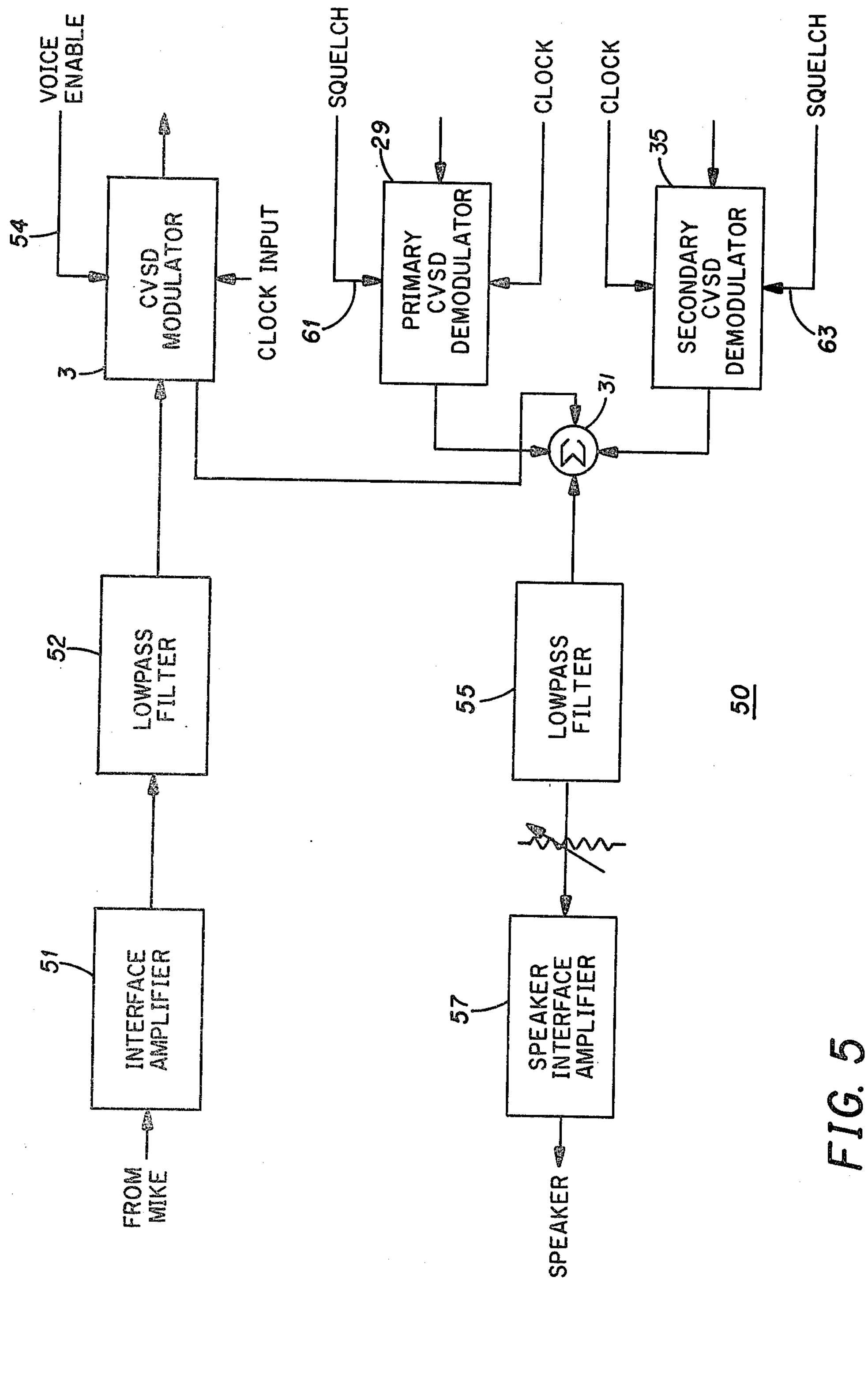
FIG. 5 is a block diagram of a continuously variable slope delta modulator.

FIG. 5 is a block diagram of the continuously variable slope delta modulation device 50 that is used as the audio-to-digital modem 2 and consists of the interface amplifier 51 which is used to interface an analog signal source, such as a microphone, to the modem, a low pass filter 52 and a continuously variable slope delta modulator device 3. The continuously variable slope modulator device 3 is voice enable and is energized upon receipt of the voice enable signal on conductor 54 from the transmit switch 8 of FIG. 1.

There is also present the primary continously variable slope delta demodulator 29 and the emergency continuously variable slope delta demodulator (CVSD) 35. The output from the demodulator is summed by the summing device 31 and passed to the low pass filter means 55 and to the speaker interface amplifier 57 for application to the speaker device 20. Separate CVSD demodulators are required for the primary and emergency channels. Digital speech data is continuously clocked out of these two continuously variable slope demodulators at 16 kilosymbols per second. Separate squelch inputs are provided to the primary and emergency channels continuously variable slope demodulators on conductors 61 and 63 respectively. The audio outputs of the two continuously variable slope delta demodulators are added together by summing device 31 to provide conferencing, and the audio output is then lowpass filtered and amplified to drive speakers or phones. The lowpass filter means 55 is used to eliminate clocking frequency components in the audio output. It should be noted that the requirements for two continuously variable slope delta demodulators is not a fixed requirement and one device can function as well as two for full duplex operation without conferencing.

Figure 6:
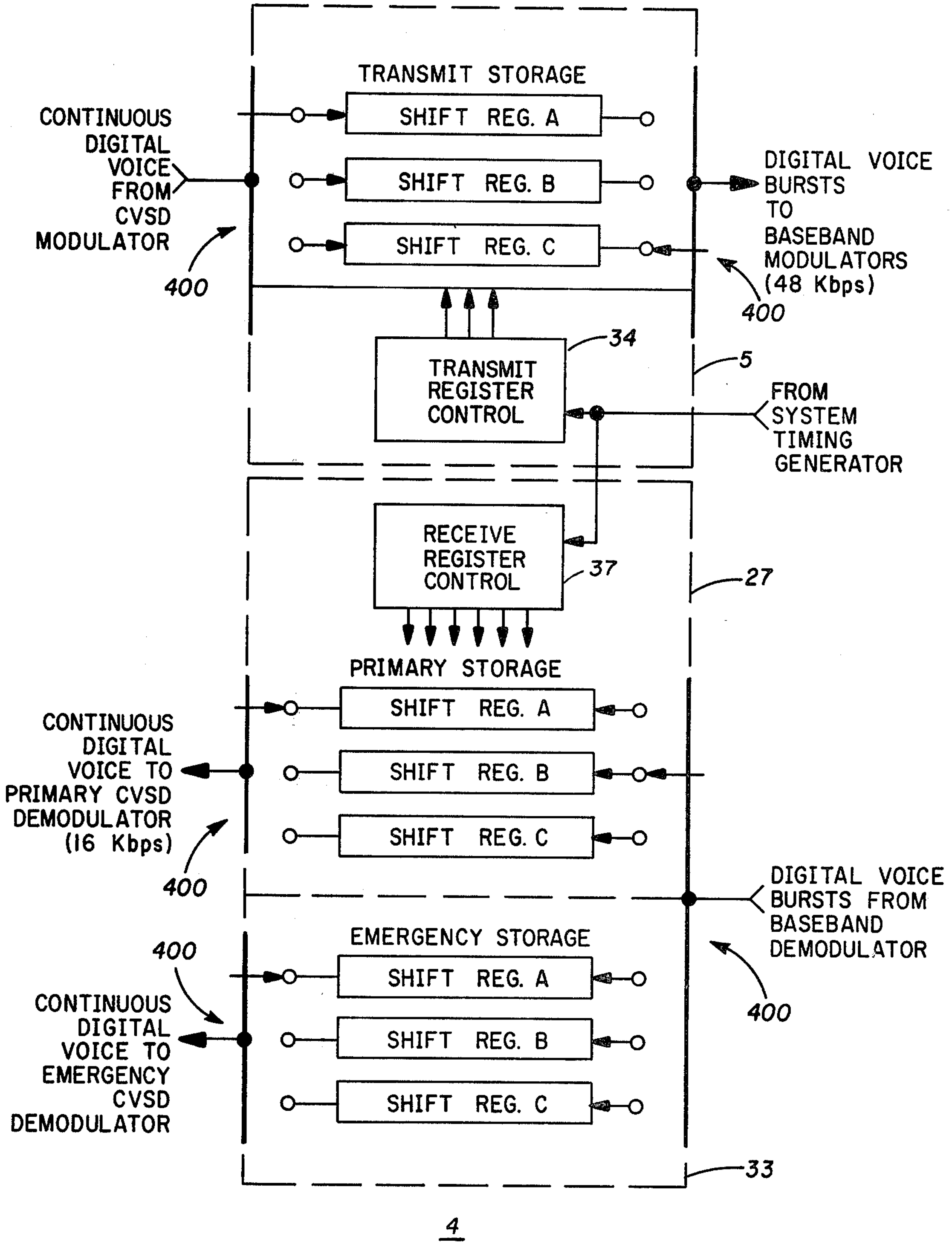
FIG. 6 is a block diagram of the digital voice processor of the anti-jam radio of FIG. 1.

The digital voice processor 4 is shown in FIG. 6 and provides a means of conferencing by packet time division multiplex of primary and emergency time slots or channels and also provides the required guard times. The digital voice signals are transmitted in packets which are burst at data rates of 48 kilosymbols per second in the preferred embodiment or three times the output of the continuously variable slope delta demodulator. For this reason, it is necessary to store up to 16 kilosymbols per second digital data from the continuously variable slope delta demodulator into shift registers and then read out these registers at transmission time at a rate of 48 kilosymbols per second burst. It should be pointed out at this time, that the reasons for the frequencies and storage capacities discussed herein are tied to the operating speeds of the continuously variable slope delta modulators and demodulators. By varying this speed, the capacity and transmission rates of the storage registers can be varied accordingly by one skilled in the art. At the receiver it is necessary to load the 48 kilosymbols per second stream from the primary and emergency channels into separate shift registers, and then read out these registers continuously at 16 kilosymbols per second into the two continuously variable slope delta demodulators.

There is provided in FIG. 6 the transmitted digital voice processor 5 which comprises three shift registers denoted phase A, phase B and phase C. The enable to the shift registers is provided by the transmitter register controller 34 which is controlled by the system timing generator 15 of FIG. 1. The multiple shift registers are required so that one register can be read out while another register is being loaded. Moreover, to minimize the delay time in storage, the burst packets are divided into shift registers so that transmission can start before the entire packet has been loaded into the shift register. For this reason, three shift registers are required for each storage function and six sequential switches 400 that sequence the loading of the shift registers. Since there are in the preferred embodiment 20 packets transmitted per second, there are 800 digital voice symbols in each packet. It, therefore, takes 50 milliseconds to load a packet of data into the 400 symbol shift registers at 16 kilosymbols per second and 16⅔ ms to unload a packet at 48 kilosymbols per second. In a similar fashion, the primary digital voice processor 27 and the emergency digital voice processor 33 operate in reverse fashion so that the shift registers are loaded at 48 kilosymbols per second and are unloaded at the rate of 16 kilosymbols per second. The operation of the primary and emergency voice processor is controlled by the receive register control 37 and the sequential switches 400.

Figure 7:
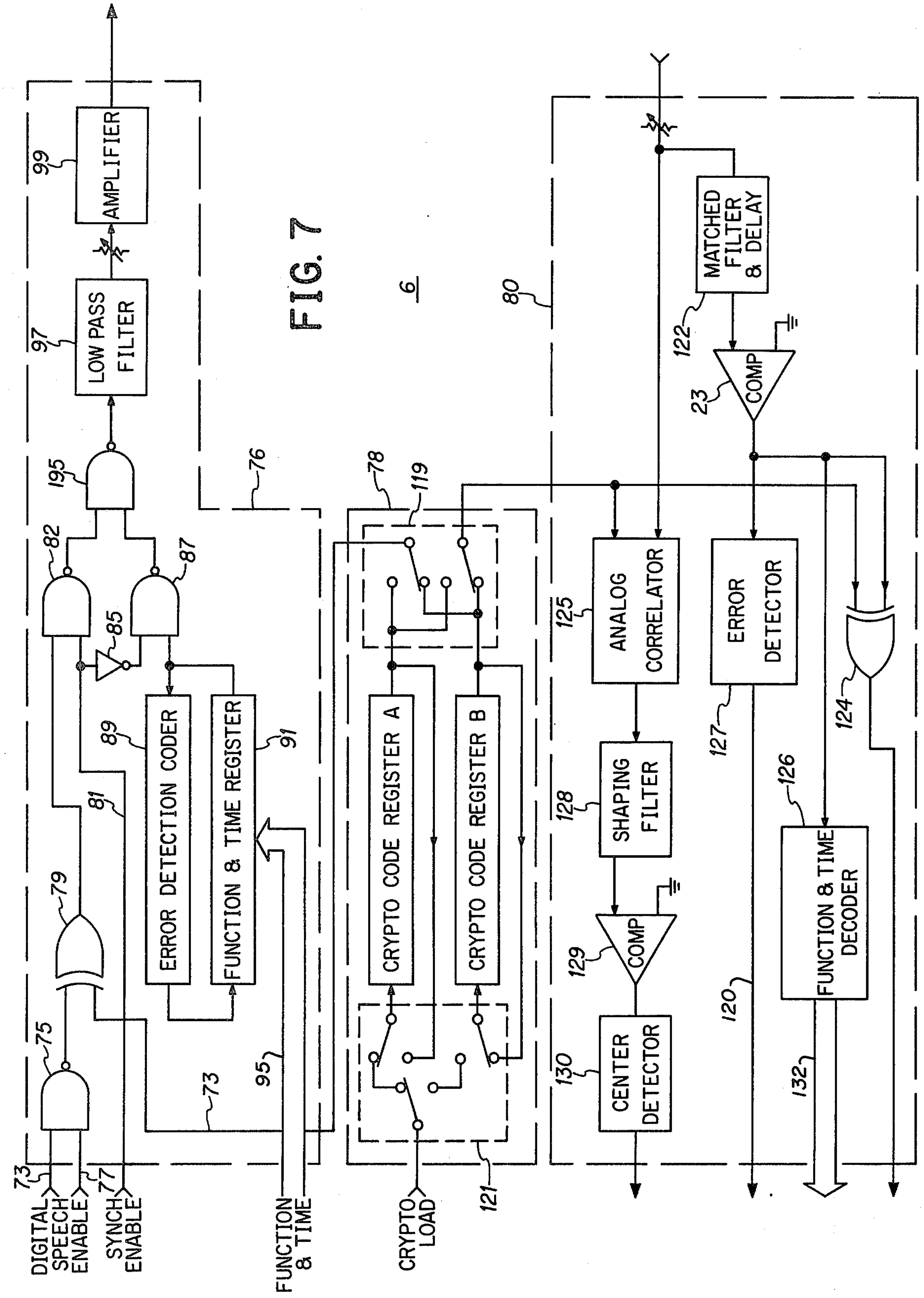
FIG. 7 is a block diagram of the baseband modem of the anti-jam radio of FIG. 1.

The baseband modem 6 provides the transmit baseband modulation encryption and filtering and the baseband demodulation decryption and synchronization and, as indicated from the names of the devices and as shown in FIG. 7, the baseband modem consists of the baseband modulator 76, crypto storage registers 78 and the baseband demodulator 80. The modem for the preferred embodiment operates at 48 kilosymbols per second for the transmission and reception of an 896 symbol burst occurring twenty times per second. During the transmission mode, the baseband modulator generates the preamble by combining the synchronous enable signal on conductor 81 with the function and time signal that is provided on conductors 95 and stored in the function and timing register 91. Both signals are provided by the system timing generator. The combining process is performed by the NAND combination of the inverter 85 and the NAND gate 87 as well as the NAND gate 195. After the synchronization period has timed out the digital speech information that is present on conductor 77 and which is provided by the digital voice processor 4 is combined by the NAND gate 75 with the speech enable signal that is provided by the system timing generator on conductor 77. The resulting signal is combined and exclusively OR'd by the gate 79 with the crypto code that is provided by the crypto code generator 78 on conductor 73 to provide the transmit message that is combined with the sync signal and the inverted sync enable signal by NAND gate 82 and passed to the low pass filter means 97 which provides any necessary filtering and impedance matching required for the amplifier 99. Amplifier 99 provides the necessary gain and impedance matching required between the baseband modem and the transceiver 13 shown in FIG. 1.

The crypto storage registers 78 consist of a crypto storage register A and a crypto register B which store the crypto codes that are generated by the crypto generator in the system timing generator. These codes are stored until needed in the baseband demodulation process. The two crypto storage registers A and B are provided so that one can be loaded while the other one is being unloaded and are controlled by the switches 119 and 121. In the preferred embodiment, each crypto storage register is loaded with an 832 symbol crypto sequence from the system timing generator. In general, the first 32 symbols stored in the crypto storage register are clocked into the exclusive OR gate 79 through conductor 73. Since the sync enable gate is enabled, these symbols enter the low pass filter and are filtered and amplified as necessary to drive the transceiver. During the next 32 symbol sequence, the sync enable line 81 is not enabled and the symbol stream is diverted from the function and time register 91, which has been loaded from the system timing generator 15. These symbols, in the preferred embodiment, designate the type of message and the time as shown in Table 1. The 32 symbols are also clocked into the error detection coder 89 where 32 additional symbols of error detection codes are generated and transmitted after the 32 symbol function and time code. The error detector code symbols are clocked into the function and time code registers as the function and time symbol are clocked out. The error detection code symbol therefore end up loaded into this register at the end of 32 clock cycles. This register is clocked for an additional 32 symbols to transmit the preamble error correction code.

At the completion of the transmission of the 96 symbol preamble, the speech enabled and sync enable lines 77 and 81 are both enable. The 800 symbols of digital voice burst are now clocked from the digital voice processor 5 along with 800 bits out of the active crypto code registers either A or B depending on the selection of the switch 121. These two data streams are combined in the exclusive OR gate 79 to obtain the encrypted digital speech symbol stream. This completes the transmission of an 896 symbol burst.

The baseband demodulator 80 detects the sync preamble, stores the function and time symbol, checks the error detection portion of the preamble, and decrypts the 800 symbol encrypted digital voice burst. In the preferred embodiment, when the receiver hops to a new frequency, the first 32 symbols of the crypto code are loaded into the binary coded analog correlator 125. Each symbol of this 32 symbol code is clocked into 4 adjacent shift register positions (not shown) so as to provide 128 reference samples which are to correlate the received sync preamble. The use of multiple samples per symbol in the sync correlation is required since there is no symbol synchronization prior to the sync preamble detection and the analog samples are therefore clocked into this correlator at four times the symbol rate in the preferred embodiment. The analog signal from the demodulator and the transceiver 13 feeds the analog correlator directly. This analog voltage is also passed through an analog passive matched filter 122 and comparator 123 in order to obtain the symbol stream for all of the decoding functions. Since symbol sync is obtained from the sync preamble, all of the functions can be performed by clocking at the symbol rate.

At the very start of a new frame, the first 32 symbols of the crypto code are shifted into the binary coded analog correlator 125 at a high bit rate so as to accomplish loading in a minimal amount of time. Each of these 32 symbols is shifted into the correlator at four times the bit rate. Once the sync code has been shifted into the reference register of the auto correlator, an analog sample of the output of the demodulator is shifted into the analog input of the correlator at four times the symbol rate, or in the preferred embodiment, 192 thousand samples per second. When the analog input signals which have been shifted into the correlator match the reference sync code, a triangular stair case of analog samples will occur at the output of the correlator indicating detection of the sync preamble. These samples are filtered by the shaping filter 128 to maintain a smooth triangle pulse. This triangle pulse is normally two symbols long. The output voltage feeds a comparator 129 which adjusts the threshold. When the peak exceeds the threshold a logic one output is generated by the comparator. This indicates the detection of the message, otherwise a logic zero is present. The center of this pulse is determined by the center detector 130 and a pulse accuracy of ⅛ of a symbol interval is generated after the center of the pulse has occurred. This pulse starts the message sequence clock in the system timing generator which controls all clocking of the other anti-jam loading and receiving function.

The next 32 symbols of the preamble are shifted into the function and time decoder 126, and are parallel shifted into the system timing generator when and if the error detector finds no error, by parallel output conductors 132. The primary emergency message indication bits are always used, however, to set appropriate flags in the system timing generator.

The last 32 bits of the preamble are clocked into the error detector 127 so as to determine if there are any bit errors in the function and time preamble. This information sets a flag on conductor 120 which is passed to the system timing generator. If any errors are detected, the system timing generator will not use the receive time to update its clock, even if all other conditions would indicate a clock update.

After having detected and processed the preamble, the crypted digital voice burst is decrypted by combining the encrypted digital voice streams with the next 800 symbols of the crypto code from the crypto storage registers A and B as dictated by switch 119. The exclusive OR gate 124 loads the appropriate primary or the optional emergency burst storage register of the digital voice processor.

The system timing generator 15 performs all timing, coordination and control functions between the various modules of the anti-jam modem and between the transceiver and control panel. In particular, the system timing generator provides real time, generates all timing signals, generates all crypto codes by the techniques known in the art including polynominal division, adds the control panels frequency and channel selections to the frequence hopping pseudorandom code to obtain transceiver frequency, adjusts the clock to a certain receive time signal, and sets the requirements through its various modes of operation, the initial sync, resync and primary and emergency or secondary packet reception. The generating of the pseudorandom frequency change code is performed within the system timing generator 15. All of the radios that are in the same communication link have identical pseudorandom number generators which can be one of the devices known in the art, including electronic random number generators, commercially available random number generators or a microprocessor with a random number generator algorithm. Once the random number is generated it is passed through a crypto code generator such as a polynominal divider or other code generators known in the art. Reference can be made to U.S. Pat. Nos. 1,479,846; 1,356,546; and 3,291,908 which provide some of the techniques used for crypto code generation. The resulting digital code is used to control the control frequency oscillator present in the transceiver 13 for generating the pseudorandomly selected center or carrier frequency.

Figure 8:
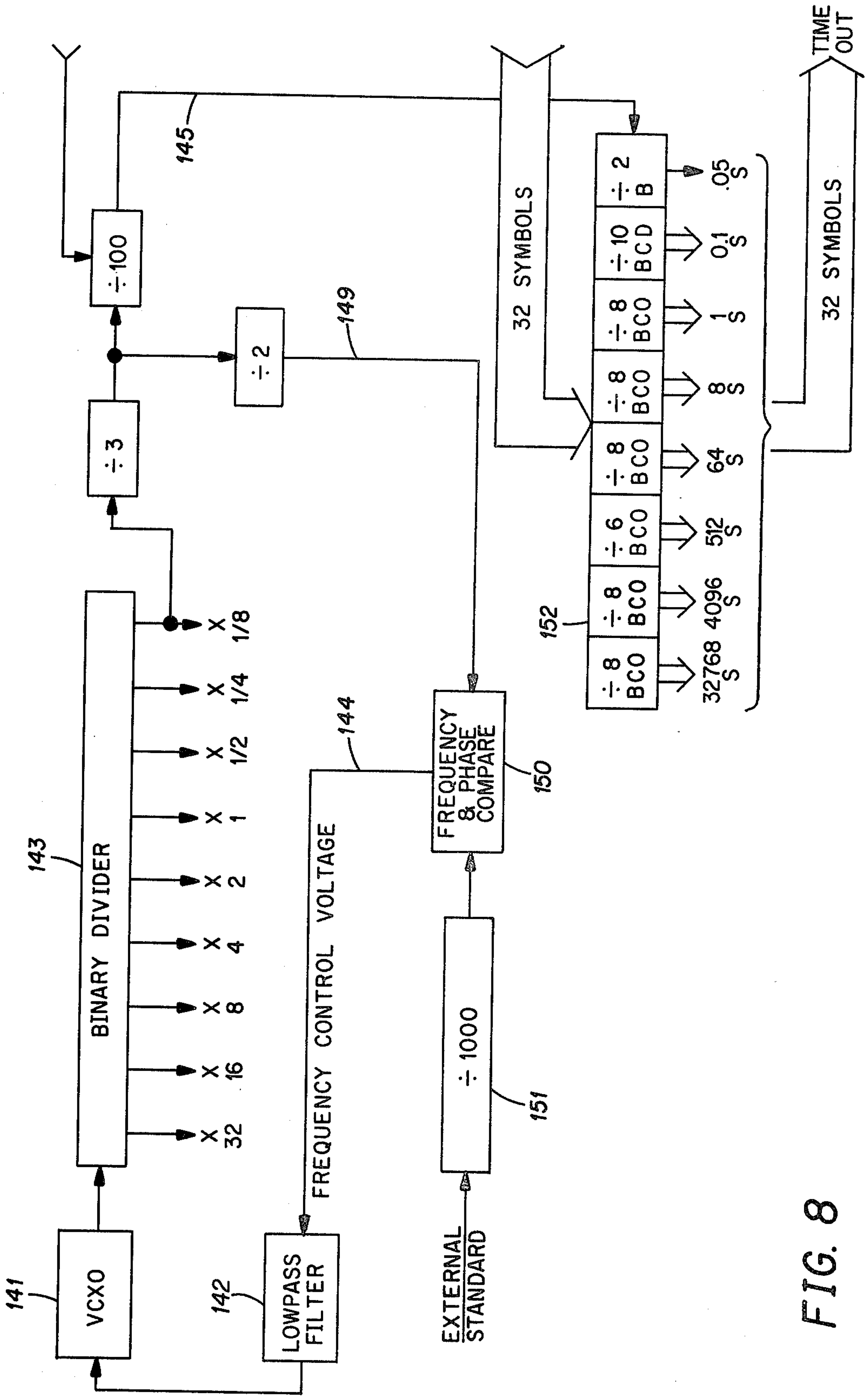
FIG. 8 is a block diagram of the master clock for the radio of FIG. 1.

A block diagram of the master clock portion of the system timing generator 15 is shown in FIG. 8. The basic master clock is a voltage control oscillator 141 which, in the preferred embodiment, operates at 3.072 megahertz. This is divided by 64 by the binary divider 143 to obtain the basic 48 kilohertz clock frequency. This in turn is divided by 2400 to obtain the basic 20 hertz signal on conductor 145 and by 48 to obtain a 1 kilohertz signal on conductor 149, for a comparison by the frequency and phase comparator device 150. The frequency in phase of the 1 kilohertz signal present on conductor 149 is compared to that of a 1 kilohertz reference obtained by dividing a one megahertz external frequency standard signal by the divider 151. The output of the phase and frequency detector is filtered by filtering device 142 and is used to control the frequency of the 3.072 megahertz voltage controlled crystal oscillator. The 32 symbol clock is provided by the register 152.

Figure 9:
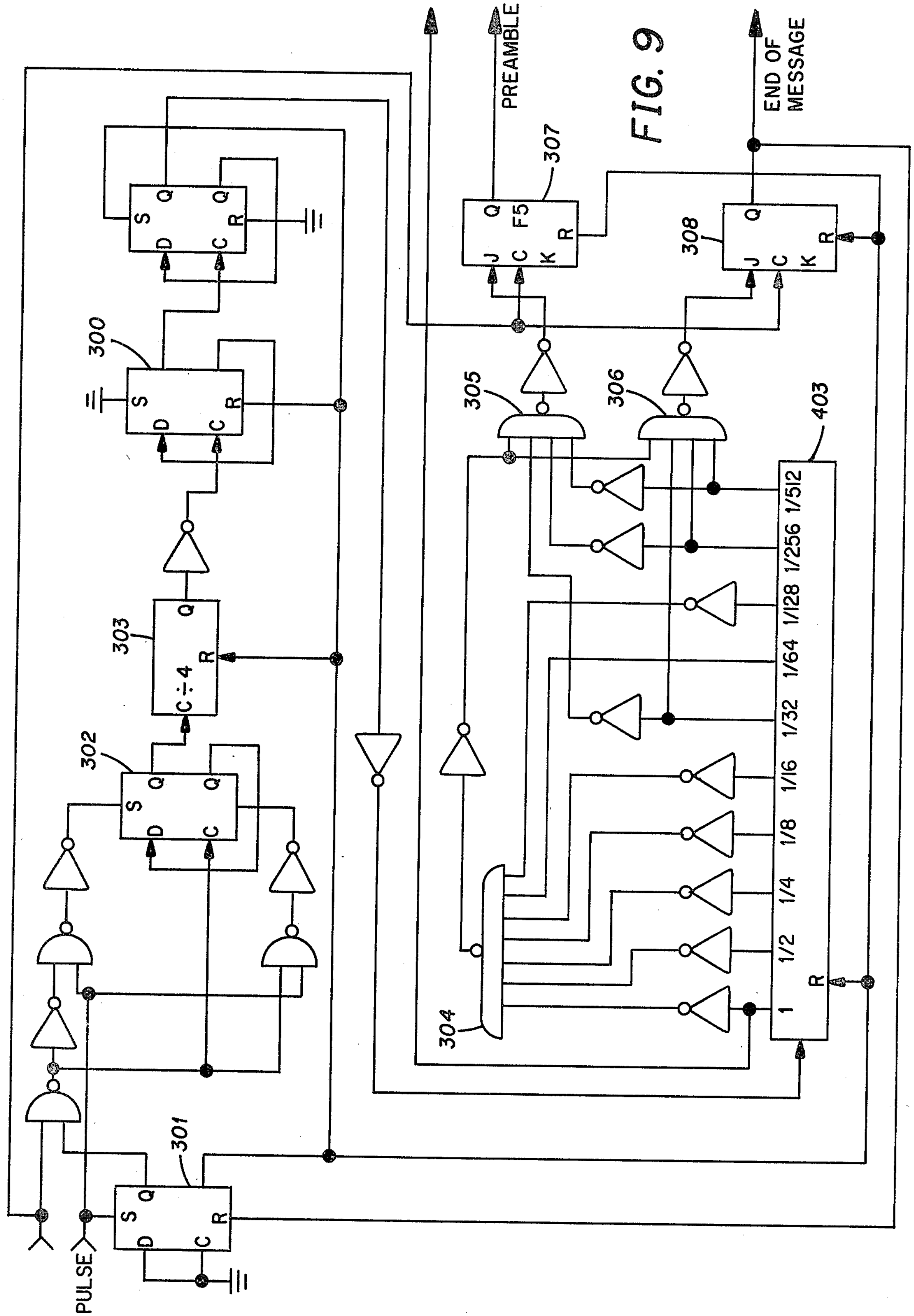
FIG. 9 is a block diagram of the symbol clock and message timer for the radio of FIG. 1.

FIG. 9 is a block diagram of the symbol clock and message timer. The symbol clock and message timer are started from the sync pulse which is provided from the center detector 130. The symbol and message clock dividers are pre-set ahead by $\frac{1}{8}$ symbol to make up for the $\frac{1}{8}$ symbol delay in the center of the sync pulse. This is accomplished by pre-setting flip-flop 300 to reset. At the beginning of the sync pulse, flip-flop 301 is set which removes the preset to all counters and provides the clock from flip-flop 302 to the counter chain 303. The sync pulse, while in the "1" state also enables flip-flop 302 as a divider so that the clock input into the divider chain is only X16 as long as the sync pulse is active. Operating the counter for the full duration of the sync pulse at half speed is equivalent to operating the counters at full speed starting at the center of the sync pulse. At the end of the sync pulse, flip-flop 301 is operated as a set/reset flip-flop 302 and provides a X32 clock that is 32 times the clock provided by counter 303.

The X32 clock is divided successively to obtain an X1 bit clock (48 KHz) and to obtain further division out to 2047 bit clock cycles. Decode gates 304, 305, and 306 are provided on the clock divider chain to indicate the end of the preamble at 64 symbols ($1\frac{1}{3}$ ms) after the sync pulse and the end of the message 864 symbols (18 ms) after the sync pulse. The preamble and end of message flags are held in flip-flops 307 and 308 respectively. The design shown assumes that all flip-flops trigger on a positive going transition while all counters trigger on a negative going transition.

There are many known means for crypto code generators known in the Art for providing the crypto code and frequency hopping sequence as well as microprocessor algorithms. Any 32 symbol length pseudorandom code generator may be used to implement this function by one skilled in the art.

Many of the functions described herein, given the teaching of the invention may be implemented by one skilled in the art including the crypto code generators and system timing functions. Thus while a particular embodiment of the present invention has been shown and/or described, it is apparent that changes and modification may be made thereon without departing from the invention in its broadest aspects. The aim of the appended claims therefore is to cover all such changes and modifications as fall within the true spirit and scope of the invention.

I claim:

1. An apparatus providing full duplex anti-jam communications with a half duplex transceiver, comprising:

means for storing digital signals into digital packets of a predetermined number of symbols;

means for transmitting each digital packet at a different transmission frequency during a transmission period that is preceded by a preceding guard band and followed by a following guard band;

means for pseudorandomly changing the carrier frequency after the expiration of the following guard band if no digital packet is being received;

means for pseudorandomly changing the carrier frequency after the completion of the reception of a digital packet during the preceding guard band;

means for demodulating a received radio signal obtaining the digital packets therefrom; and means for converting the digital packet into a received digital signal.

2. The apparatus according to claim 1 in which the means for storing the digital signal into digital packets of a predetermined number of symbols comprises:

a first, second and third shift register means;

a means for sequentially loading the digital signal into the first, second and third shift registers at a first rate; and means for sequentially unloading the first, second and third shift registers at a second rate.

3. The apparatus according to claim 2 further comprising:

a means for generating a first clock pulse that is used to load the first, second and third shift registers at the first rate; and a means for generating a second clock pulse that is three times as fast as the first clock pulse for unloading the first, second and third shift registers at the second rate.

4. The apparatus according to claim 1 wherein the means for converting the digital packet into a digital signal, comprising:

a first, second and third shift register;

means for sequentially loading the digital packet into the first, second and third shift registers at a second rate; and means for sequentially unloading the first, second and third shift registers at a first rate.

5. The apparatus according to claim 4 further comprising:

a means for generating a first clock pulse that is used to load the first, second and third shift registers at the first rate; and a means for generating a second clock pulse that is three times as fast as the first clock pulse for unloading the first, second and third shift registers at the second rate.

6. The apparatus according to claim 1 wherein the means for pseudorandomly changing the the carrier frequency comprises:

a code generator;

means for generating a random number;

means for passing the random number through the code generator;

a controllable frequency generator; and means for interfacing the output of the code generator into the controllable frequency generator whereby in response to the output of the code generator, the controllable frequency generator will provide a pseudorandomly selected transmission frequency.

7. The apparatus according to claim 1, further comprising:

means for converting sound waves into an analog signal;

means for converting the analog signal into a digital signal;

means for converting the received digital signal into a receive analog signal; and means for converting the analog signal into output sound waves.

8. A method of providing full duplex communications with a half-duplex transceiver, comprising:

storing digital signal into digital packets of a predetermined number of symbols;

transmitting each digital packet at a different transmission frequency during a transmission period that is preceded by a preceding guard band and followed by a following guard band;

pseudorandomly changing the carrier frequency after the expiration of the following guard band if no digital packet is being received;

pseudorandomly changing the carrier frequency after the completion of the reception of a digital packet during the preceding guard band;

demodulating a received radio signal to obtain the digital packets therefrom;

converting the digital packet into a received digital signal.

* * * * *